US007287813B2

(12) United States Patent
Aliev

(10) Patent No.: US 7,287,813 B2
(45) Date of Patent: Oct. 30, 2007

(54) VEHICLE SEAT COVER

(76) Inventor: Adil Aliev, 411 English Pl., Mamaroneck, NY (US) 10543

( * ) Notice: Subject to any disclaimer, the term of this patent is extended or adjusted under 35 U.S.C. 154(b) by 95 days.

(21) Appl. No.: 11/357,990

(22) Filed: Feb. 22, 2006

(65) Prior Publication Data
US 2007/0194589 A1 Aug. 23, 2007

(51) Int. Cl.
B60R 21/04 (2006.01)
(52) U.S. Cl. ............... 297/219.1; 119/771; 296/24.31; 297/229; 297/188.2
(58) Field of Classification Search ............ 297/188.2, 297/219.1, 229, 39.1, 24.31; 5/94, 118; 119/771
See application file for complete search history.

(56) References Cited

U.S. PATENT DOCUMENTS

| 1,233,661 | A | * | 7/1917 | Gordon | 224/542 |
|---|---|---|---|---|---|
| 1,959,974 | A | * | 5/1934 | Westgate | 296/24.33 |
| 2,228,948 | A | | 1/1941 | Field | |
| 2,641,773 | A | * | 6/1953 | Kramer | 5/94 |
| 3,735,430 | A | * | 5/1973 | Platz | 5/118 |
| D251,341 | S | | 3/1979 | Bodrero | |
| 4,512,286 | A | | 4/1985 | Rux | |
| 4,723,814 | A | | 2/1988 | Hunt | |
| 4,924,814 | A | | 5/1990 | Beaudet | |
| 4,943,105 | A | | 7/1990 | Kacar | |
| 5,133,294 | A | | 7/1992 | Reid | |
| 5,215,345 | A | | 6/1993 | Orphan | |
| 5,294,166 | A | | 3/1994 | Shapland | |
| 5,487,361 | A | | 1/1996 | Dean | |
| 5,716,096 | A | | 2/1998 | Pryde | |
| 5,957,528 | A | | 9/1999 | Campbell | |
| 6,135,635 | A | | 10/2000 | Miller | |
| 6,327,726 | B1 | | 12/2001 | Weber | |
| 6,406,085 | B1 | | 6/2002 | Stanesic | |
| 6,447,059 | B1 | | 9/2002 | Jackson | |
| 6,485,099 | B2 | | 11/2002 | Illulian | |
| 6,742,837 | B1 | * | 6/2004 | Alexander | 297/188.21 |
| D500,623 | S | | 1/2005 | Jones | |
| 6,926,341 | B1 | | 8/2005 | Addesso | |
| 2002/0096919 | A1 | | 7/2002 | Sparks | |

(Continued)

FOREIGN PATENT DOCUMENTS

DE 4238363 5/1993

(Continued)

Primary Examiner—Peter R. Brown
(74) Attorney, Agent, or Firm—Richard C. Litman

(57) ABSTRACT

The vehicle seat cover is a flexible sheet for covering the rear seat, and the rear face of the front seat, of a vehicle when a load is stored in the rear seat. If the user is transporting an animal or refuse, for example, the vehicle seat cover protects the front and rear seats from damage. The vehicle seat cover includes a base sheet, a front sheet that is releasably secured to the base sheet, and a pair of side sheets, which are also releasably secured to the base sheet. Both the front sheet and the rear portion of the base sheet are provided with a plurality of straps and releasable connectors for, respectively, securing the front sheet to the front seat and the rear portion of the base sheet to the rear seat. When not in use, the front sheet and the pair of side sheets may be detached from the base sheet and the sheets may be folded, secured to one another and transported by the user.

16 Claims, 9 Drawing Sheets

U.S. PATENT DOCUMENTS

2004/0183347 A1  9/2004  Szabo
2005/0130537 A1  6/2005  Phelps
2005/0140192 A1  6/2005  Hanks
2005/0236874 A1  10/2005  Godshaw

FOREIGN PATENT DOCUMENTS

FR  2642711  8/1990
WO  WO9412366  6/1994

* cited by examiner

VEHICLE SEAT COVER

BACKGROUND OF THE INVENTION

1. Field of the Invention

The present invention relates to vehicle accessories for motor vehicles, and particularly to a vehicle seat cover for covering both the rear seat of a vehicle and the rear face of the front seat of the vehicle when cargo is stored in the rear seat.

2. Description of the Related Art

A wide variety of protective covers have been utilized to protect vehicle seats from damage when a load is carried in the seat. Animals are often transported in cars and SUV's, for example, and can cause considerable damage to the vehicle seats with their claws, teeth and excretory waste. Inanimate loads, such as crates with sharp edges, can also cause great damage to the vinyl or cloth of a vehicle seat. Most seat protectors include some sort of flexible sheet, usually in the form of a tarp or thick mat, as is often used in the field of furniture moving.

A simple tarp or mat, however, does not remain in place with respect to the seats and requires some sort of fastening device to hold the sheet in place. Typical covers may have a plurality of straps, hooks or the like to the hold the cover in place. However, these fasteners are rarely adjustable, making it difficult to apply the cover to multiple types of vehicle seats, and are typically not versatile, in that they cannot be connected to multiple support surfaces within the vehicle.

Further, such covers typically only cover the rear seat and the rear surface of the front seat. The interior sidewalls or interior faces of the doors are left unprotected from damage. Additionally, such covers are typically formed from a single sheet, contoured to fit inside a vehicle, but which are difficult to fold and transport.

Thus, a vehicle seat cover solving the aforementioned problems is desired.

SUMMARY OF THE INVENTION

The vehicle seat cover is a flexible sheet for covering the rear seat and the rear face of the front seat of a vehicle when a load is stored in the rear seat. If the user is transporting an animal or refuse, for example, the vehicle seat cover protects the front and rear seats from damage. The vehicle seat cover includes a base sheet, a front sheet that is releasably secured to the base sheet, and a pair of side sheets, which are also releasably secured to the base sheet. A releasable front fastener, such as a hook and loop fastener, releasably secures the front sheet to the base sheet. Similarly, a pair of side fasteners releasably secure the pair of side sheets to the base sheet.

Both the front sheet and the rear portion of the base sheet are provided with a plurality of straps and releasable connectors for securing the front sheet to the front seat and the rear portion of the base sheet to the rear seat, respectively. The straps are provided with releasable fasteners that cooperate with one another, such as quick release buckles, allowing the front straps to fasten about, for example, the headrest portions of the front seat, or about a handle mounted to the ceiling of the vehicle. The rear straps extend behind the rear seat of the vehicle to secure the base portion to the rear seat.

Further, the side sheets also have side straps secured thereto, allowing the side portions to be releasably secured to the front sheet and rear portion of the base sheet. When secured in this fashion, a five-sided protective enclosure is formed in the rear portion of the vehicle, providing protection for the inner doors or walls associated with the rear seat.

When not in use, the front sheet and the pair of side sheets may be detached from the base sheet and the sheets may be folded, secured to one another, and transported by the user.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
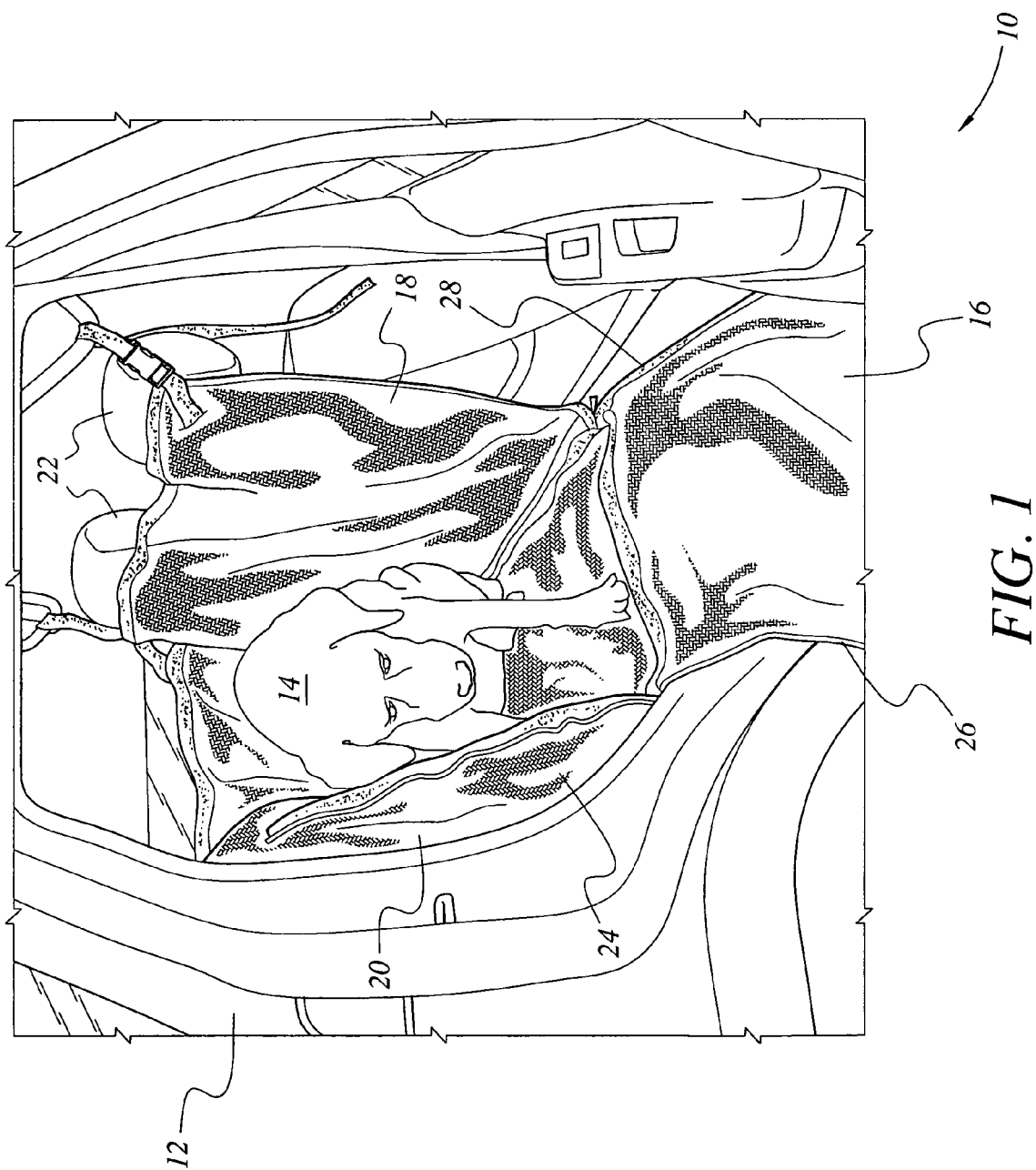
FIG. 1 is an environmental, perspective view of a vehicle seat cover according to the present invention with the vehicle door open to show the interior of the vehicle.

As illustrated in FIG. 1, the vehicle seat cover 10 covers the rear seat(s) 24 and the rear face(s) of the front seat(s) 22 of vehicle 12, protecting the seats from damage caused by cargo, such as dog 14, stored in the rear of vehicle 12. Although shown as dog 14, the cargo may be any load, such as a crate or a bag of mulch, which can damage the material of the seats through gouging, chewing, spilling or the like. The vehicle seat cover 10 is highly versatile, may be adapted for use with any suitable vehicle, and can be applied to other vehicle surfaces, such as the front seat, a truck bed, or the like.

As will be described in greater detail below, with particular reference to FIGS. 3 and 4, the vehicle seat cover includes a base sheet 54, having a central portion 36 and a rear portion 20. Rear portion 20 covers the upright, upper portion of rear seat 24, and central portion 36 covers the horizontal, lower portion of rear seat 24. A detachable front sheet 18 covers the rear faces of front seats 22, with the lower end of front sheet 18 being releasably secured to a front portion of base sheet 54.

Figure 2:
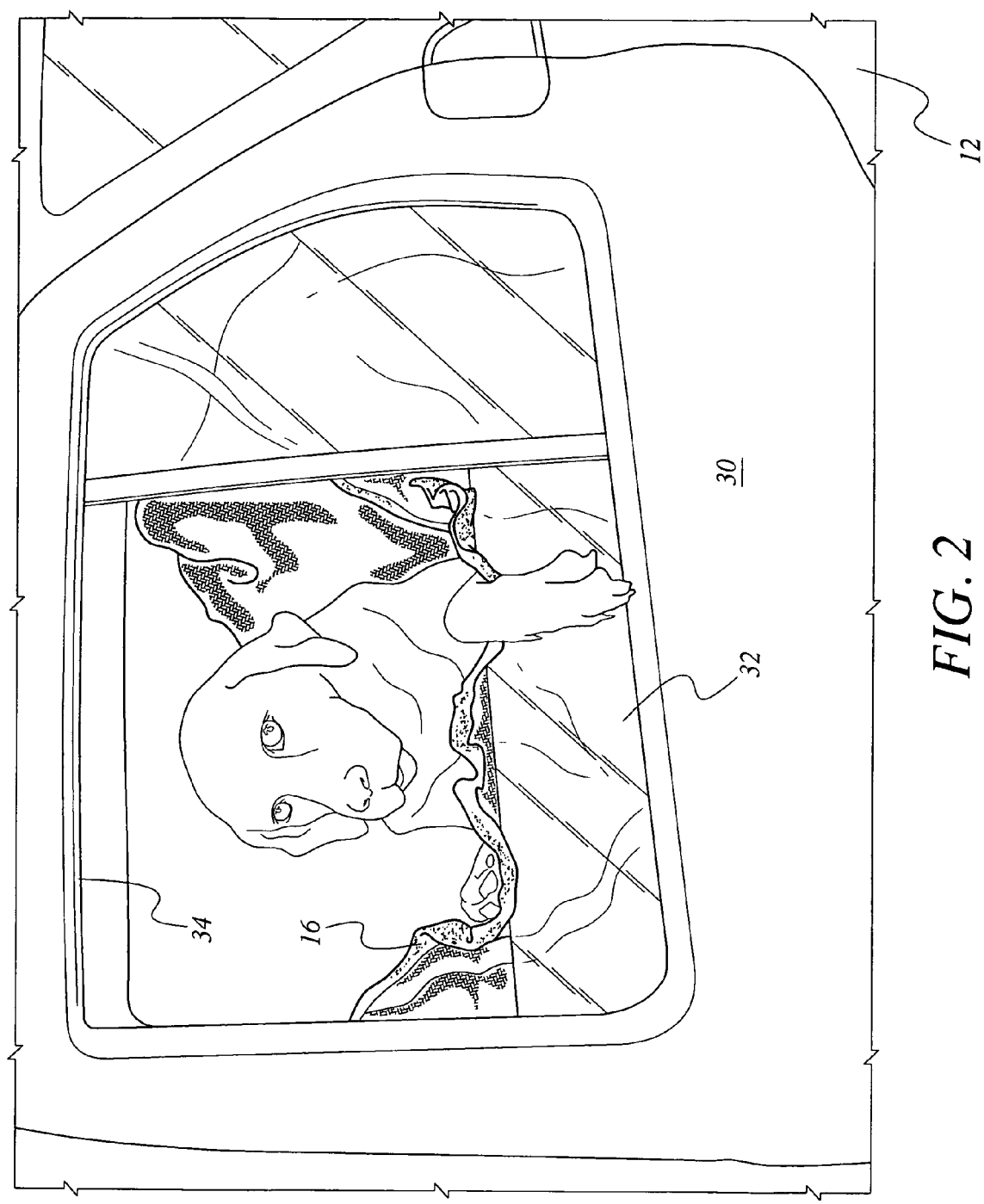
FIG. 2 is an environmental, perspective view of the vehicle seat cover according to the present invention with the vehicle door closed as seen from the exterior of the vehicle.

A pair of side sheets or panels 16 are further releasably secured to a pair of opposed side portions of base sheet 54. As shown, in FIG. 1, the far side sheet 16 is held in a substantially vertical position (to be described in greater detail below), and the near side sheet 16 is draped over the side of rear seat 24, providing a protective covering for seat 24 when dog 14 enters or exits the vehicle. As shown in FIG. 2, the side sheet 16 can be raised to protect the inner door or wall of vehicle 12 when door 30 is closed. The side sheet 16 may be draped over a partially open window 32, and the height of side sheet 16 is adjustable through the adjustable closure of zippers 26, 28 (shown in FIG. 1). The adjustable closure allows the user to adapt the vehicle seat cover 10 for use in a variety of vehicles having window frames 34 positioned at different heights, and for windows 32 raised to different levels. As will be described below, the side sheet 16 may be secured in a substantially vertical position to the rear portion 20 and to the front sheet 18, allowing for usage when the window is closed (shown in FIG. 1 with regard to the far side sheet 16).

The side sheet 16 may be secured to the window, as will be described in greater detail below, through the use of an elastic strip 41. Alternatively, a fastener, such as a hook and loop fastener, for example, may be secured to the side sheet 16 for engaging a complementary fastener that is permanently or temporarily secured to the window. In still another alternative, each side sheet 16 may include a pair of hooks that engage the window and maintain the side sheet 16 in place with respect to the door. Any suitable attachment element may be utilized to maintain side sheets 16 in a substantially vertical orientation in order to protect the inner door or wall of the vehicle.

Base sheet 54, side sheets 16 and front sheet 18 are formed from canvas, heavy cloth, tarpaulin, padded material or any other suitable flexible, transportable protective material. With regard to the drawings, it should be understood that the size and contouring of base sheet 54, side sheets 16 and front sheet 18 are dependent upon the needs and desires of the user and may be manufactured in a variety of sizes and shapes in order to be used with a variety of differing vehicles. The materials used in the construction of vehicle seat 10 are preferably non-toxic to animals, such as dog 14.

Figure 3:
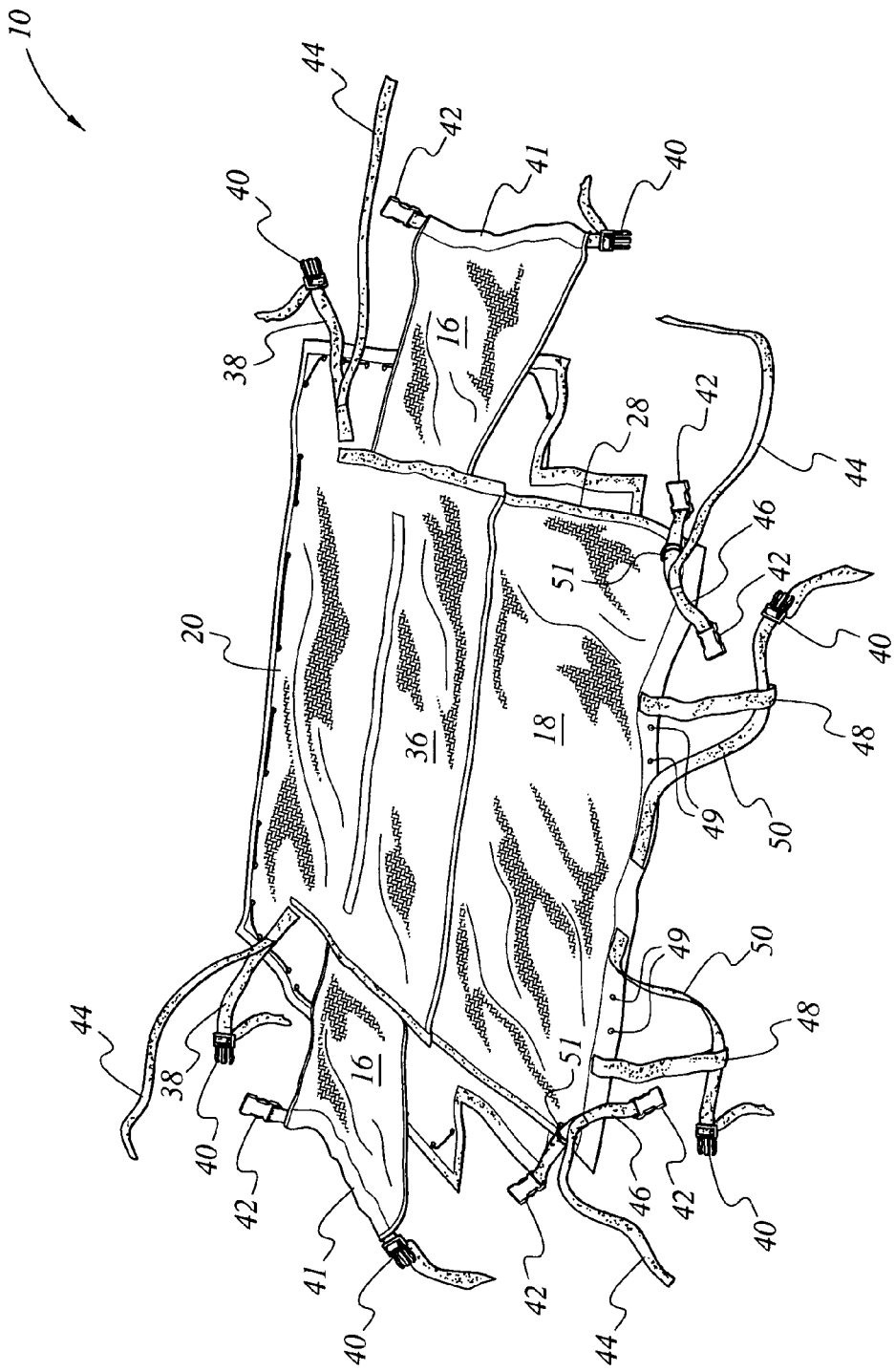
FIG. 3 is a perspective view of the vehicle seat cover according to the present invention.
Figure 4:
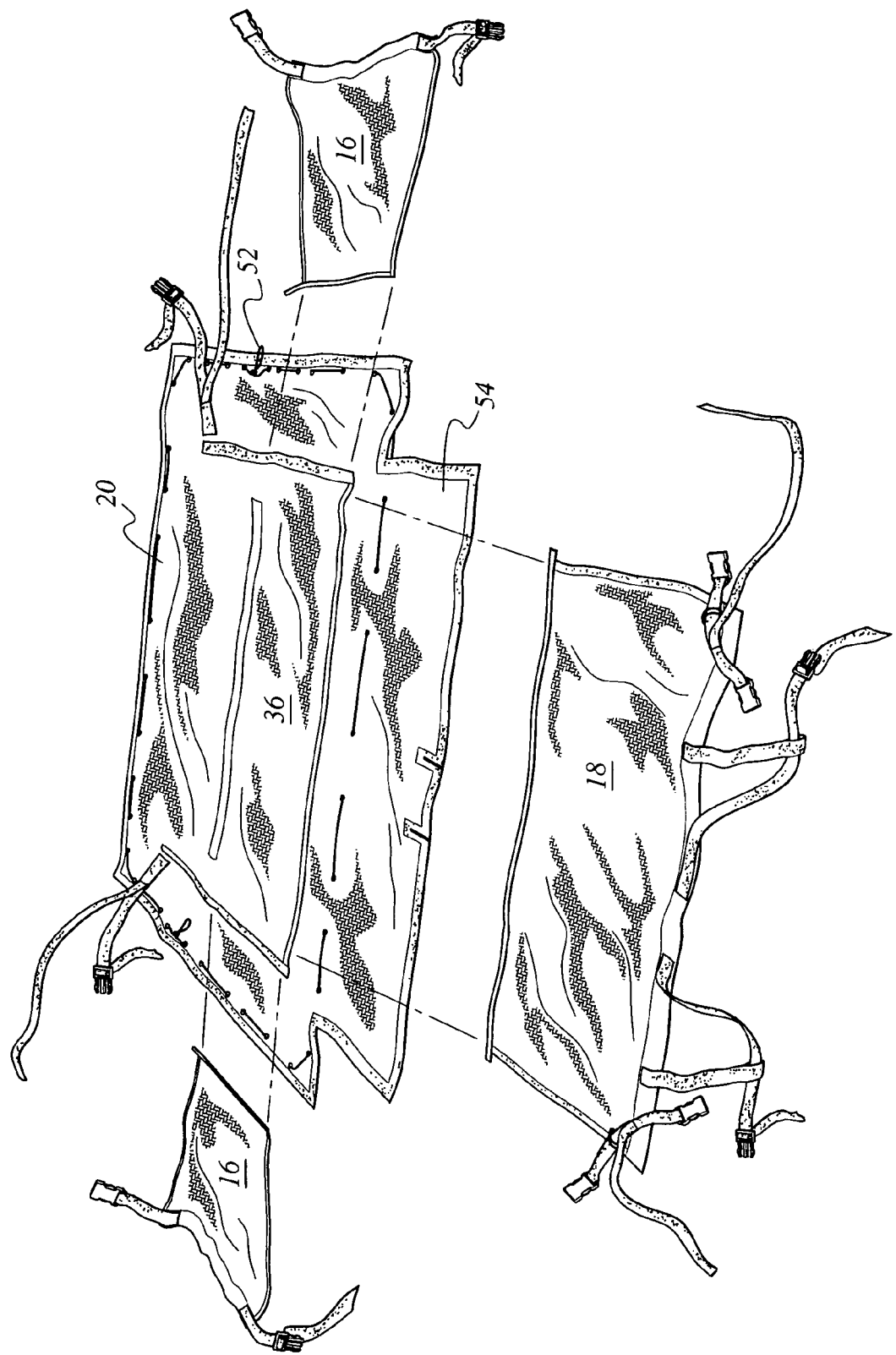
FIG. 4 is a partially exploded perspective view of the vehicle seat cover according to the present invention.
Figure 5:
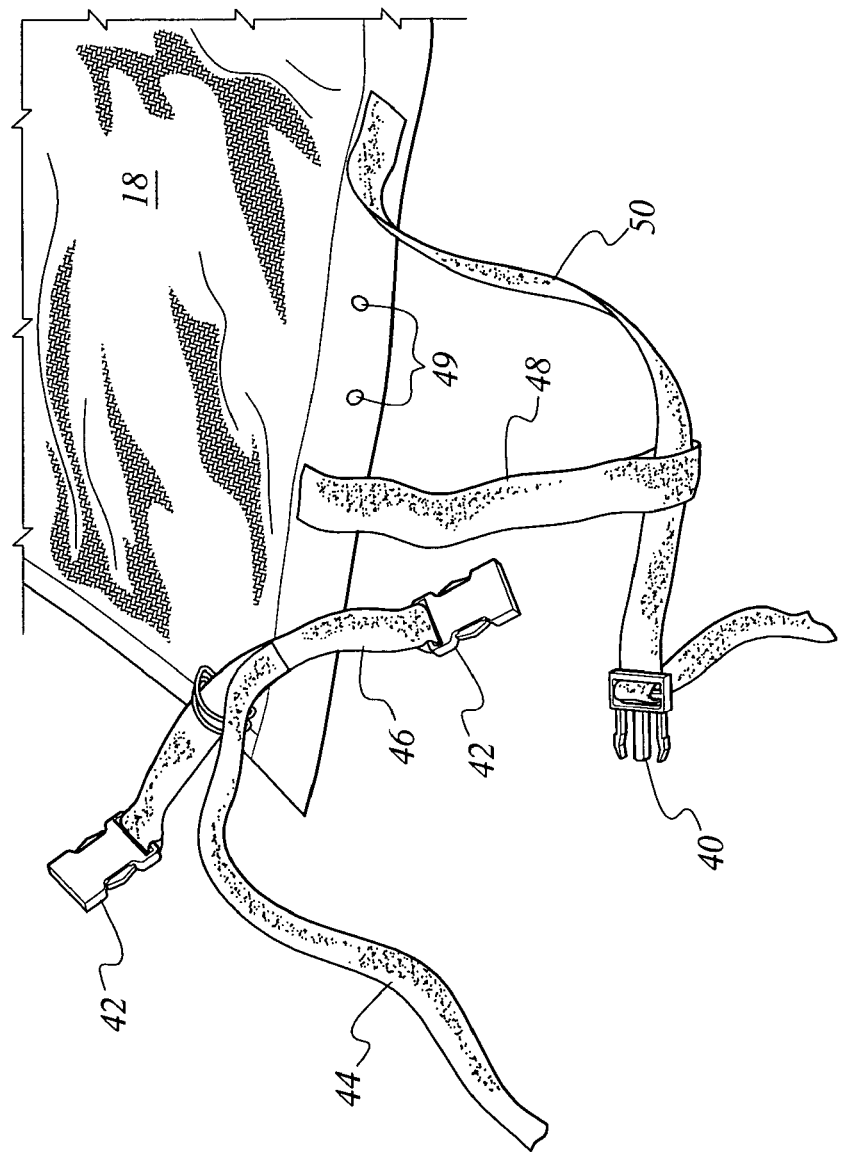
FIG. 5 is a partial, fragmentary perspective view of the vehicle seat cover according to the present invention, illustrating the front attachment straps of the front sheet.

Referring to FIGS. 3 and 4, front sheet 18 is shown having front and rear opposed edges, with the rear edge of front sheet 18 being releasably secured to base sheet 54. Front sheet 18 is releasably secured by hook and loop fasteners, buttons, snaps, a zipper or any other suitable releasable fastener. Positioned on opposite sides of the front edge are front straps 46, with each front strap 46 including a fixed end and a pair of free ends. As shown in FIG. 5, one free end may be partially secured to sheet 18 by rings 51 dimensioned to receive strap 46 slidable therethrough, depending upon the needs and desires of the user, and depending upon the particular configuration and use of the front sheet 18. Rings 51 may have a substantially D-shaped contour in the preferred embodiment.

Each free end terminates in a female quick release buckle end 42, which releasably engages a corresponding male quick release buckle end 40, as will be described in further detail below. It should be understood that any suitable releasable connector elements may be substituted for quick release buckle ends 40 and 42, depending upon the needs and desires of the user.

A pair of attachment straps 50 are further secured to the front edge of front sheet 18, with each attachment strap 50 having a fixed end and a free end. The fixed ends of attachment straps 50 and front straps 46 are secured to the front edge by stitching or any other suitable method of secure connection. The free ends of attachment straps 50 each terminate in a male buckle connector 40, which further acts as an adjustable buckle by threading strap 50 through adjacent loops formed in buckle end 40, allowing the user to adjust the length of each attachment strap 50.

Figure 6:
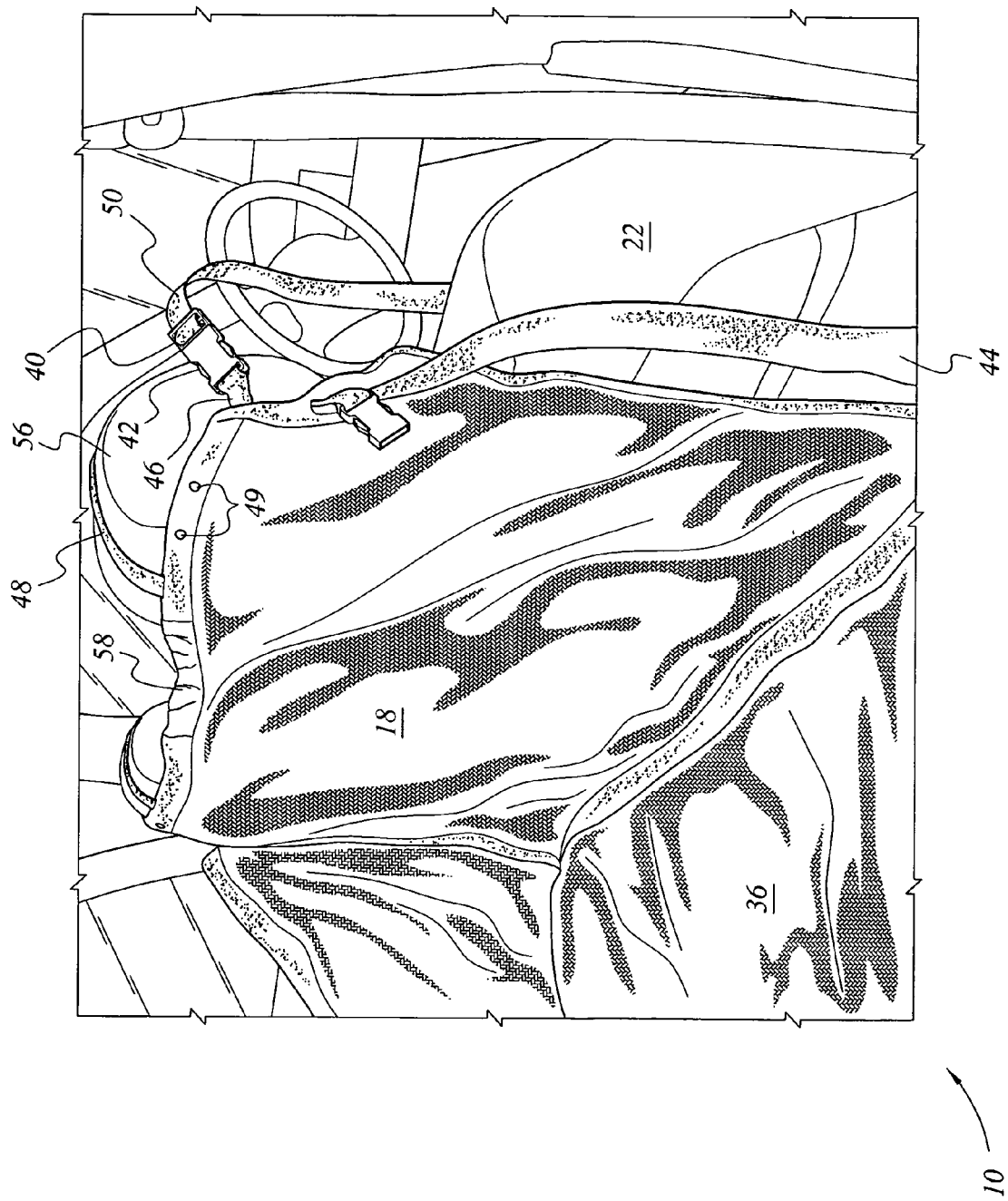
FIG. 6 is a partial environmental perspective view of the vehicle seat cover according to the present invention, showing the front sheet attached to a front seat of the vehicle.

A pair of fabric loops 48 are further provided and are fixed to the front edge of front sheet 18. As shown in FIG. 5, the user may pull the free end of a respective one of the attachment straps 50 through the loop 48 to partially secure the attachment strap 50 therethrough. As shown in FIG. 6, when used in combination with a headrest of a vehicle, attachment strap 50 can be secured to a corresponding one of front straps 46 and loop 48 can be positioned over the headrest. Depending upon the size and configuration of the seat and headrest, the loop formed by attachment strap 50 and front strap 46 may be positioned over the headrest to secure the front sheet 18, or additional securement may be required, which is accomplished by first inserting attachment strap 50 through loop 48.

Alternatively, as shown in FIG. 1, front straps 46 may be used in combination with handles mounted on the roof of the vehicle in order to secure the front sheet 18 in a substantially vertical position. Further, the front edge of front sheet 18 may be provided with two pairs of openings 49, as shown in FIGS. 3 and 5. In a vehicle with detachable headrests, the user may remove the headrest from the front seat and position the pair of headrest supports through openings 49, in order to secure the front sheet 18 to the front seat.

A pair of adjustment straps 44 are also secured to the front edge of front sheet 18, and are adapted for grasping by the user during adjustment or transportation of the cover 10. A similar pair of adjustment straps 44 are secured to the rear portion 20 of base sheet 54. The rear portion 20 also includes a pair of rear straps 38, each having a fixed end and a free end terminating in a male quick release buckle connector 40, similar to attachment straps 50. Attachment straps 50, rear straps 38, adjustment straps 44 and front straps 46 are formed from nylon or any other suitable flexible, high-strength material.

Side sheets 16 are releasably joined to base sheet 54, as shown in FIG. 4. Similarly to front sheet 18, the side sheets are releasably secured along their rear edges by hook and loop fasteners, zippers, buttons, snaps or any other suitable releasable fasteners. Each side sheet 16 has a pair of buckle connectors 40, 42 mounted on opposite sides of the forward edge. Male connectors 40 each releasably engage a corresponding female connector 42 of front straps 46, and female connectors 42 of side sheets 16 each releasably engage a corresponding male connector of rear straps 38. As shown in FIG. 1, this connection secures the side sheet 16 in a substantially vertical position, as shown by the far side sheet. The near side sheet 16 is free and, as described above, may be partially raised by actuation of adjustable zippers 26, 28. Each forward edge includes an elastic strip 41, extending the length thereof. The elastic strips 41 allow the user to secure the side sheets 16 on a wide variety of surfaces, such as the irregularly shaped partially opened window of FIG. 2.

As shown in FIG. 6, an elastic strip 58 may be mounted, through stitching or any other suitable attachment method, to the front edge of front sheet 18. Elastic strip 58 is mounted substantially centrally with respect to the front edge and aids in tightening the front sheet 18 about the front seats 22 of the vehicle 12. Additionally, the vehicle seat cover 10 may include pockets or flaps sewn onto front sheet 18, base sheet 54 or side flaps 16, allowing the user to store items therein, or allowing one sheet to be stored within another sheet, e.g., a pocket or flap stitched onto base sheet 54 for storing side flaps 16 therein during transport. Additional pockets or flaps sewn onto vehicle seat cover 10 would allow for optimal versatility, portability and functionality of the vehicle seat cover.

Figure 7:
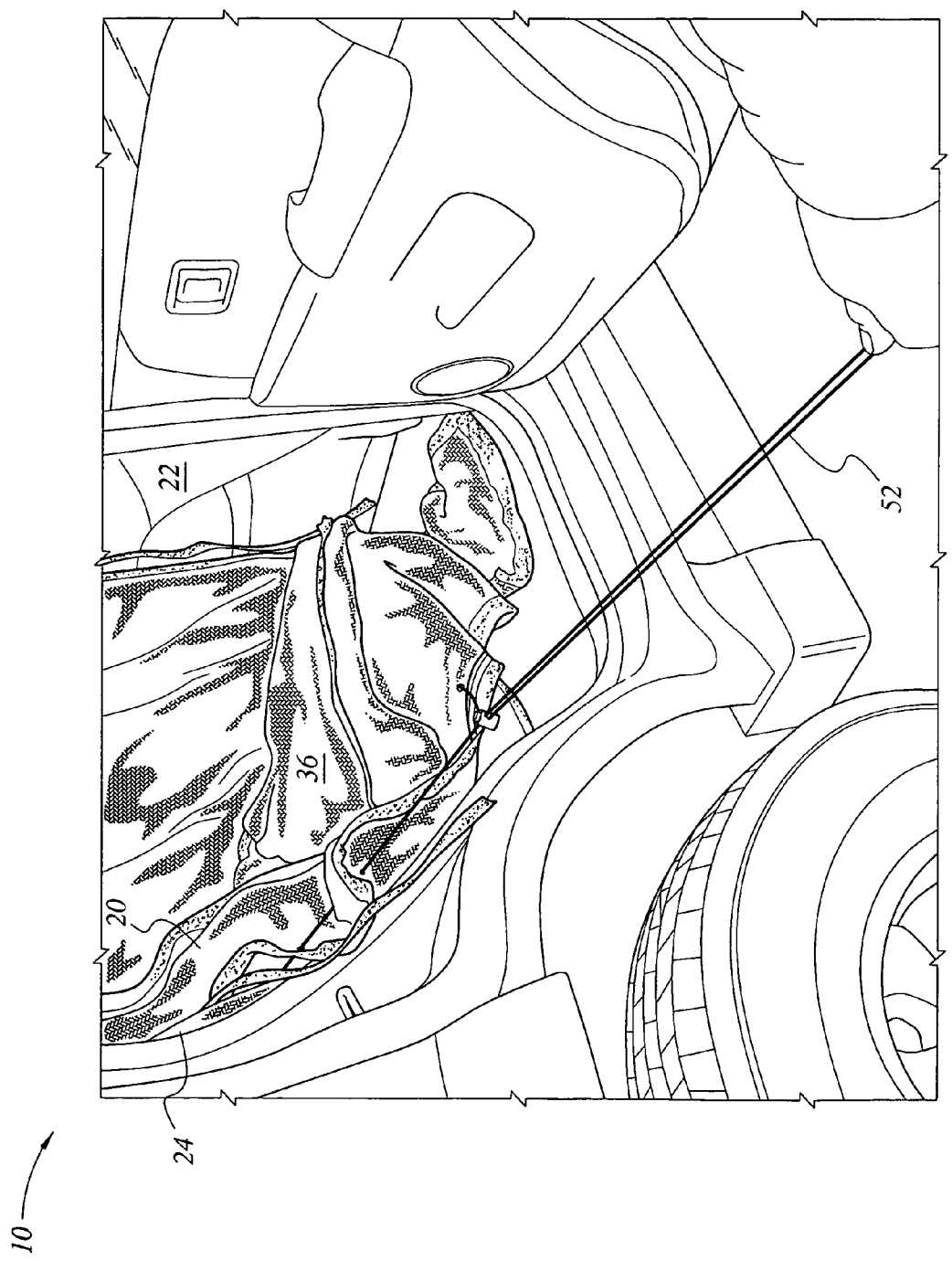
FIG. 7 is a partial environmental perspective view of the vehicle seat cover according to the present invention, illustrating user adjustment of the base sheet.

As shown in FIG. 4, an adjustment cord 52 is sewn into a periphery of base sheet 54. Adjustment cord 52 may be nylon or any other suitable material, and has a user-adjustable length. As shown in FIG. 7, the user may pull adjustment cord 52 in order to tighten rear portion 20 and central portion 56 about the rear seats 24. Further, in positioning the vehicle seat cover 10 to a wide variety of seats and seating configurations, openings or slots may be provided in the vehicle seat cover 10 to allow for the passage of a seat belt therethrough. Different models of vehicle having differing locations for seatbelts, thus the cover may be placed between or around seatbelts on one type of vehicle, but in another, the seatbelt must pass through the material of the cover in order to maintain effective coverage. These openings or slots may be sealed through the use of zippers, buttons, or any other suitable releasable closure elements.

Figure 8:
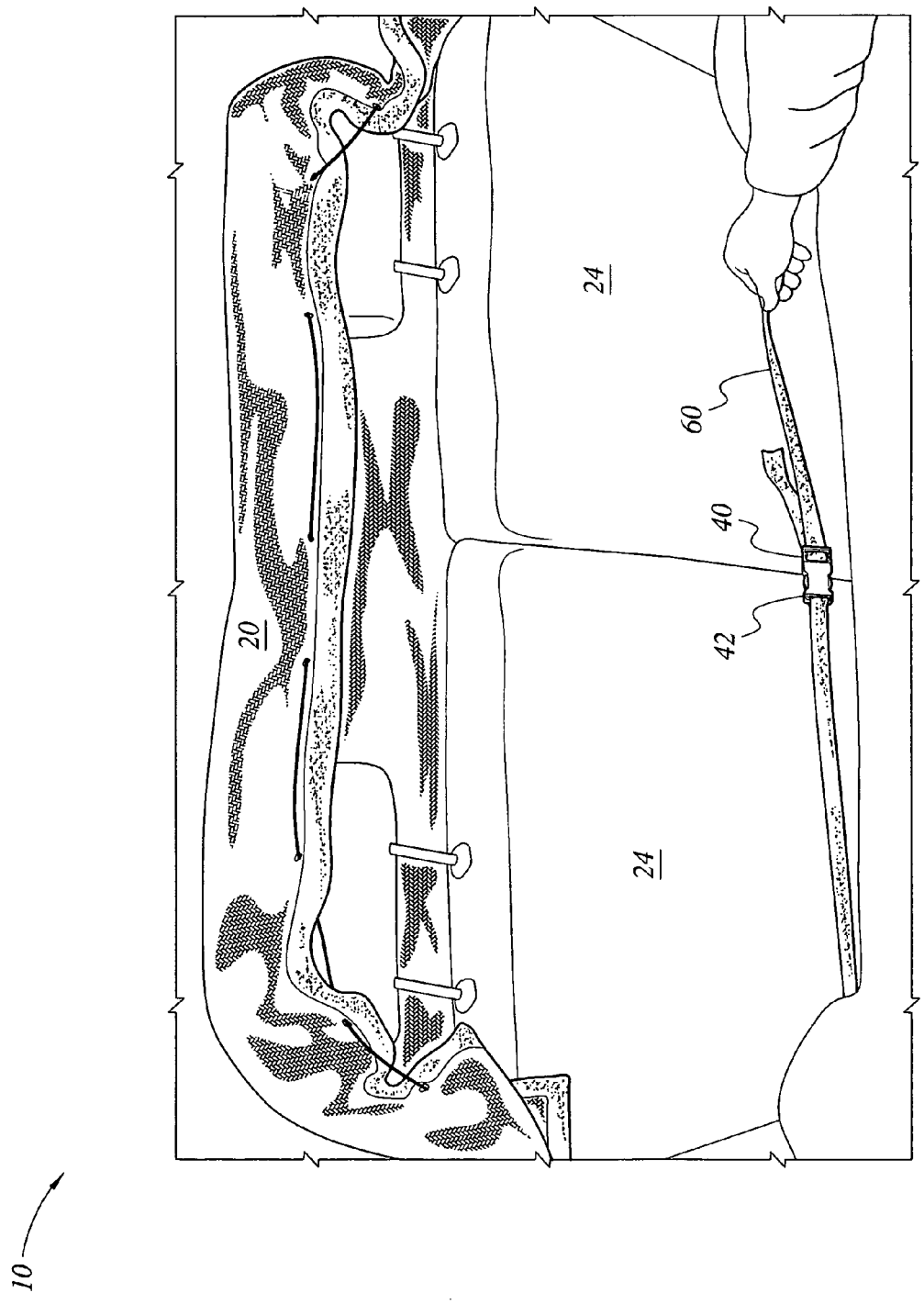
FIG. 8 is a partial environmental perspective view of the vehicle seat cover according to the present invention, illustrating attachment of the base sheet to the rear seat of the vehicle, and showing user adjustment of a pair of rear attachment straps.

As shown in FIG. 8, the rear edge of rear portion 20 is positioned over the headrests, or the tops of the seats, of rear seats 24. Following tightening of adjustment cord 52, the rear portion 20 may be further secured to the rear seats 24 by a pair of retaining straps 60. Retaining straps 60 each have a fixed end secured to the lower surface of base sheet 54, and a free end, with one end terminating in a male buckle connector 40, and the other free end terminating in a corresponding female buckle connector 42. The lengths of retaining straps 60 are adjustable and, when secured, allow the user to tighten the rear portion 20 about the seats 24, with the retaining straps 60 passing around the rear of the rear seats 24, as shown.

Figure 9:
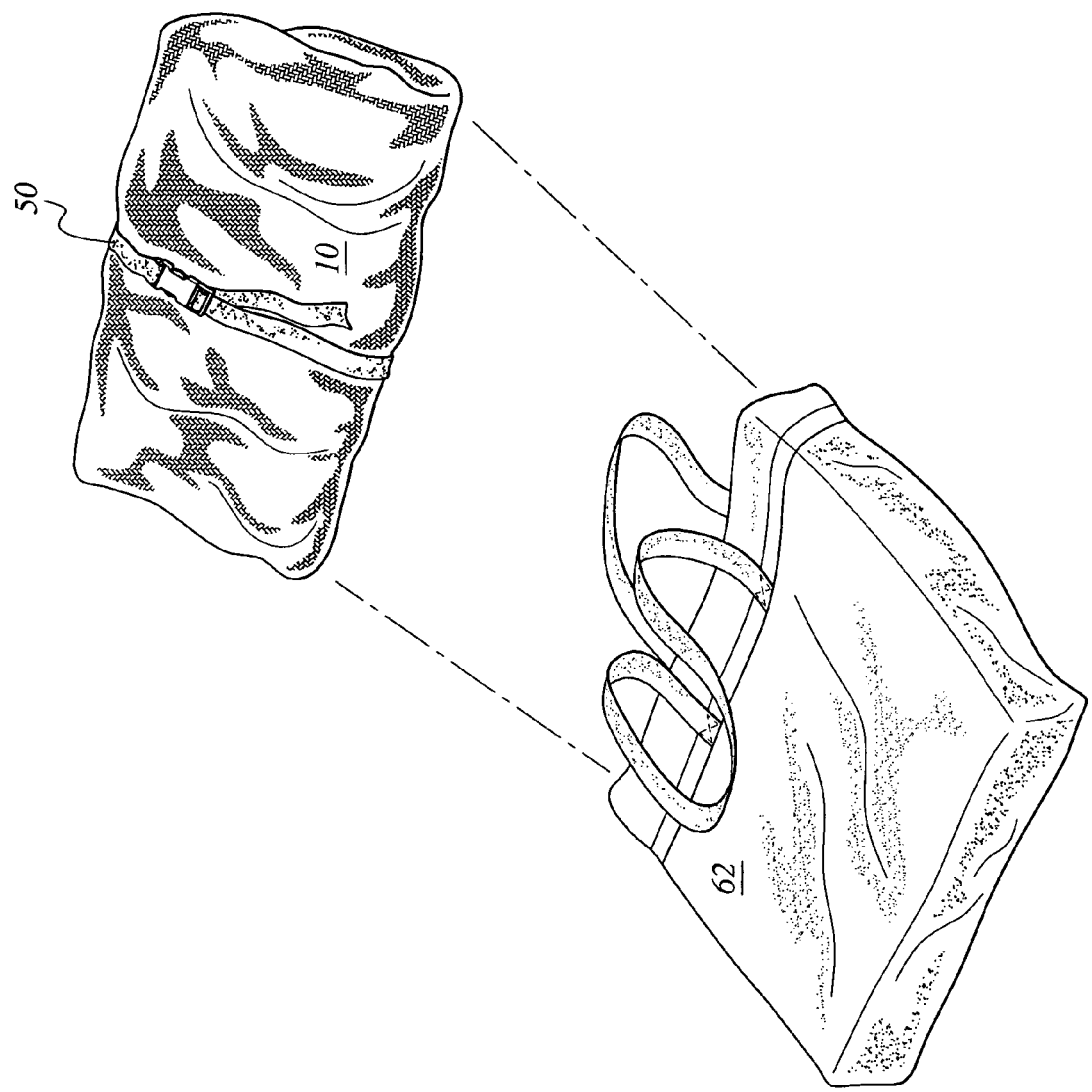
FIG. 9 is a perspective view of the vehicle seat cover and storage bag according to the present invention, illustrating insertion of the folded vehicle seat cover into the bag for storage and transport when not in use.

As illustrated in FIG. 9, the vehicle seat cover 10 is foldable and portable. When not in use, the sheets may be folded together and secured by a pair of straps, such as, for example, attachment straps 50. The folded vehicle seat cover 10 may be carried in a bag 62, or in any other protective, transportable housing, depending upon the needs and desires of the user.

It should be noted that the vehicle seat cover 10 has been shown and described as covering the rear seat of a motor vehicle. It should be understood that vehicle seat cover 10 is versatile and multi-functional, and may be used to cover any suitable surface, such as a front seat or the cargo area of a sports utility vehicle, and may further be used in combination with any type of vehicle, or any surface which requires protection.

It is to be understood that the present invention is not limited to the embodiments described above, but encompasses any and all embodiments within the scope of the following claims.

I claim:

1. A vehicle seat cover, comprising:
   a base sheet having a front portion, a central portion, a rear portion and a pair of opposed side portions;
   a front sheet releasably attached to the front portion of the base sheet;
   a pair of side sheets releasably attached to a respective one of the side portions of the base sheet;
   front attachment means for releasably securing the front sheet to at least one front seat of a vehicle;
   rear attachment means for releasably securing the rear portion of the base sheet to at least one rear seat of the vehicle,
   whereby the front sheet is adapted for selectively and releasably covering a rear face of the at least one front seat, the rear portion is adapted for selectively and releasably covering a front face of the at least one rear seat, the central portion of the base sheet is adapted for selectively and releasably covering a lower seat surface of the at least one rear seat, and the pair of side sheets are adapted for selectively and releasably partially covering a pair of inner walls or doors of the vehicle, the vehicle seat cover protecting the at least one rear seat and the at least one front seat from damage when a load is stored on the rear seat.

2. The vehicle seat cover as recited in claim 1, wherein said front attachment means comprises:
   first and second front straps secured to a front edge of said front sheet, the front straps being laterally opposed with respect to one another, each of the first and second front straps having a fixed end and a free end;
   a plurality of first releasable connectors, each of the free ends of the first and second front straps having a respective one of said first releasable connectors secured thereto;
   first and second attachment straps secured to the front edge of said front sheet, the first and second attachment straps being positioned adjacent the first and second front straps, respectively, each of the first and second attachment straps having a fixed end a free end;
   a plurality of second releasable connectors, each of the free ends of the first and second attachment straps having a respective one of said second releasable connectors secured thereto, whereby said pair of first releasable connectors releasably engage said pair of second releasable connectors, the first and second front straps and the first and second attachment straps releasably securing the front edge of said front sheet to the front seat of the vehicle.

3. The vehicle seat cover as recited in claim 2, further comprising a pair of fabric loops, each of the fabric loops being secured to the front edge of said front sheet, the loops being positioned between one of said attachment straps and a respective one of said front straps, each of the fabric loops being adapted to receive one of the free ends of a respective one of said attachment straps.

4. The vehicle seat cover as recited in claim 2, wherein each of said first and second front straps is formed from a pair of flexible strips joined to one another at the fixed end, each of the flexible strips having a free end, a pair of said first releasable connectors being secured to the free ends of the flexible strips, respectively.

5. The vehicle seat cover as recited in claim 4, further comprising first and second side straps secured to a side edge of each of said side sheets, each of the side straps having a fixed end a free end, each of the free ends of each of the first side straps having one of said second releasable connectors secured thereto for releasably engaging a respective one of said first releasable connectors secured to one of said flexible strips.

6. The vehicle seat cover as recited in claim 5, wherein said rear attachment means comprises a pair of rear straps, each of the rear straps being secured to the rear portion of said base sheet, the rear straps being positioned laterally opposed from one another, each of the rear straps having a fixed end a free end, each of the free ends having one of said second releasable connectors secured thereto, whereby each of the free ends of each of said second side straps has one of said first releasable connectors secured thereto for releasable engagement with said second releasable connectors of the rear straps.

7. The vehicle seat cover as recited in claim 6, further comprising a pair of rear adjustment straps, each having a free end and a fixed end, each of the fixed ends being secured to a respective one of the fixed ends of said rear straps, each of the free ends being adapted for grasping by the user to adjust the vehicle seat cover on the rear seat.

8. The vehicle seat cover as recited in claim 6, further comprising adjustable attachment means for adjustably and releasably securing opposed front and rear edges of each of said side sheets to said front sheet and the rear portion of said base sheet, respectively.

9. The vehicle seat cover as recited in claim 8, wherein said adjustable attachment means comprises a zipper.

10. The vehicle seat cover as recited in claim 2, further comprising an elastic strip mounted on the front edge of said front sheet, the elastic strip being positioned between said first and second attachment straps.

11. The vehicle seat cover as recited in claim 2, further comprising a pair of rear securement straps secured to said base sheet, each of the rear securement straps having a free end and a fixed end, one of the free ends having one of said first releasable connectors secured thereto, the other one of the free ends having one of said second releasable connectors secured thereto, the rear securement straps being adapted to extend across a rear surface of the at least one rear seat, said first releasable connector releasably engaging said second releasable connector to selectively and releasably secure said base sheet to the rear seat.

12. The vehicle seat cover as recited in claim 2, wherein each of said first and second front straps and each of said first and second attachment straps has a selectively adjustable length.

13. The vehicle seat cover as recited in claim 1, further comprising a cord woven into said base sheet about a periphery thereof, the cord being adjustable, whereby the user may tighten said vehicle seat cover about said front and rear seats by selectively adjusting the cord.

14. The vehicle seat cover as recited in claim 1, further comprising a storage bag for storing and transporting said base sheet, said front sheet and said pair of side sheets when the vehicle seat cover is not in use.

15. The vehicle seat cover as recited in claim 1, further comprising a front releasable fastener for releasably securing a rear edge of said front sheet to said base sheet.

16. The vehicle seat cover as recited in claim 1, further comprising a pair of side releasable fasteners for releasably securing a distal edge of each of said side sheets to said base sheet.

* * * * *